Figure 1:
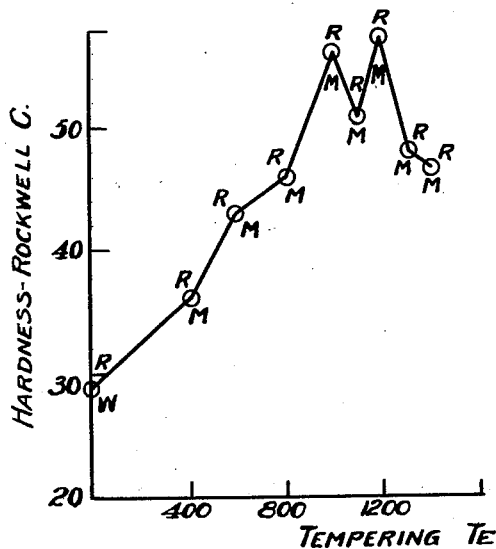

Nov. 7, 1933.  R. C. BECKER ET AL  1,934,520
ALLOY STEEL
Filed March 9, 1931

TEMPERING TEMPERATURE—°F.

WITNESSES
aBWallace.
F.B. Flick

INVENTORS
Robert C. Becker and
Franklin H. Allison, Jr.
by Brown & Critchlow
their attorneys.

Patented Nov. 7, 1933

1,934,520

UNITED STATES PATENT OFFICE 1,934,520

ALLOY STEEL

Robert C. Becker, Orange, N. J., and Franklin H. Allison, Jr., Pittsburgh, Pa., assignors to Crucible Steel Company of America, New York, N. Y., a corporation of New Jersey Application March 9, 1931. Serial No. 521,059

13 Claims. (Cl. 75—1)

This invention relates to alloy steels, and particularly to tool-resistant steels for the production of barrier members.

One of the chief uses of such steels is for the production of jail bar, which must be tool proof to prevent escape of prisoners. Plain carbon steels were used for this purpose, because when fully hardened they possess high resistance to tools. These steels, however, lose their tool resistant qualities upon being heated to 600 or 700° F., and, when this became known to criminals, jail deliveries were effected by sawing the bars after applying the simple heat treating means available to prisoners. Therefore, to be effective, jail bar must be tool proof in both the "as installed" and the tempered conditions.

Up to recent years the standard mode of testing jail bar was for an average operator to attempt to cut the bar after it had been heated by an ordinary blow torch, using an ordinary hack saw blade having 16-teeth-per-inch. If the bar could not be cut by this procedure it was deemed to be tool proof and suitable for jail bar.

Tested by this method the austenitic manganese steels were tool proof. That is, jail bar formed from these steels, for instance steels containing about 1.5 per cent of carbon, about 7 per cent of manganese, and about 3 per cent of chromium, were supposed to be tool proof in the natural condition. and also to retain their tool resistant properties after being heated to about 1000° F., which was the approximate temperature obtained with the blow torches then in use. In consequence jail bar was made extensively from these manganese steels, and the bars at first successfully prevented jail deliveries.

More recently, however, it has been found that these supposedly tool-proof manganese alloy steel bars could be attacked successfully by criminals attempting to escape from imprisonment. Higher temperatures are available with the modern blow torch than with those used formerly, and hack saw blades have been improved substantially. Thus, it was found that a skilled operator having knowledge of the proper manner of use of hack saws, can cut these manganese alloy steel jail bars by means of a modern blow torch and a special saw blade having 32 teeth per inch and flexible back. Consequently, prisoners making use of these modern advances, have succeeded in effecting escape from jails.

An extended series of tests made by us in this connection has shown that the manganese steels, both with and without other alloying elements, undergo a considerable decrease in saw resistance when tempered between about 1050 to 1200° F. This tempering range is relatively narrow, and its exact location depends upon the composition of the particular steel, but our tests have shown that all of the known steels of this class will lose their tool-proof quality somewhere within the range given. Because such temperatures are obtainable with an efficient plumber's torch, these steels are not tool-proof, and barrier members, such as jail bar, formed from them do not fulfill their purpose when subjected to skilled attack. The combination of heating and improved saw blades offers a drastic attack, and it has been found that steels which are resistant to the usual machining operations and ordinary hack saw blades are not proof against it.

As used herein, the term "tool-proof" means that a bar under test cannot be cut by a special hack saw blade having 32 teeth per inch in the hands of an operator skilled in the proper method of cutting. Also, the term "torch test" has the signification which is standard among jail building architects. This test consists in subjecting the bar to the heat of a plumber's blow torch for one hour, allowing it to cool to room temperature, and then testing it for its tool-proof quality. The maximum temperature attained by the torch in such a test is approximately 1200° F.

The term "natural condition" used in the following specification and claims has reference to the alloys as fabricated, i. e. as rolled, for example, without any other treatment. Likewise, "tempering" means heating for an hour at a given temperature, followed by cooling the specimen in air.

The objects of this invention are to provide alloy steels and barrier members formed therefrom which are tool-proof and abrasion-resistant both in the natural condition and after the torch test or other tempering, are of relatively simple composition, and are readily fabricated; and particularly to provide steels and members of the type referred to which have a structure of an austenitic character that becomes harder and tool-resistant upon cold work, and by thermal treatment, but which does not soften sufficiently to lose its tool resistance upon tempering or in the torch test.

Figure 2:
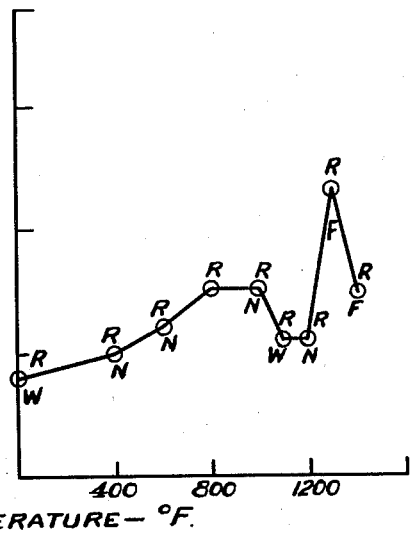
Figure 3:
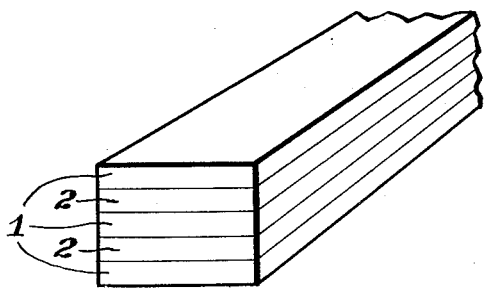
Figure 4:
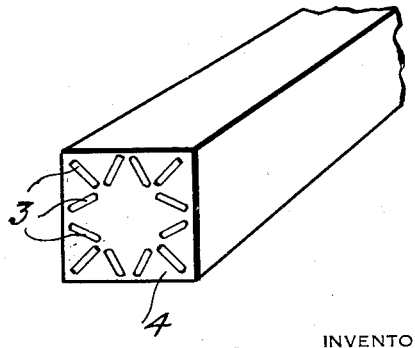

In the accompanying drawing Figs. 1 and 2 are graphs showing certain properties of the alloys provided by this invention; and Figs. 3 and 4 perspective views illustrating two forms of barrier members which may be made from these steels.

We have found, and it is upon this that our invention is predicated, that steels containing relatively high percentages of carbon, together with regulated amounts of chromium, molybdenum and nickel, are tool-proof in the natural condition, and, unlike the austenitic manganese alloy steels, they do not exhibit loss of saw resistance when tempered at temperatures in the range of or well in excess of those obtainable with a plumber's blow torch. The alloys provided by this invention are therefore especially adapted for the production of barrier members. As will appear presently, they are well suited also for abrasion resisting, for hot work and for non-magnetic purposes.

The austenitic manganese alloy steels to which reference has been made apparently are converted to the martensitic condition upon being cold worked, and they remain tool-resistant after tempering below certain critical temperatures. However, the loss of tool-resistance of these steels within certain ranges indicates that the martensite, which is magnetic, is decomposed to troostite, or some other relatively soft constituent which does not resist saw attack.

Our alloys are characterized by being tool-proof after tempering, and after the torch test. We believe this to be due to our alloys being austenitic, and being convertible to martensite, or combinations of austenite and martensite, but resisting appreciable conversion to troostite, or other soft constituent, and that it is this latter factor which renders them valuable and distinguishes them from the prior alloys. In other words, we believe that the alloys provided by the invention have an unstable austenitic structure which decomposes into martensite readily upon being cold worked, and upon being tempered. However, tempering does not convert the structure into troostite or other relatively soft non-saw resistant constituent, or at least not sufficiently to indicate the loss of saw resistance which characterizes the prior steels. Be that as it may, our steels are tool proof in the natural condition, as well as after tempering.

In its broader aspects the invention embodies steels containing from about 0.5 to 2.5 per cent of carbon, more than about 1 per cent each of chromium and molybdenum, and from about 3.0 to 8 per cent of nickel. In the production of tool-proof articles the carbon content should be between about 0.9 and 2.25 per cent, within which range the steels possess particularly valuable physical and tool-proof qualities. In the preferred embodiment of the invention the carbon content lies toward the middle of the range just given, for example from 1.5 to 1.75 per cent, because these steels possess all of the desirable qualities referred to, and they process well.

The nickel, chromium and molybdenum apparently act in combination to provide the desirable austenite characteristics. That is, they cooperate to produce an austenite which decomposes readily to martensite when cold worked, and which may undergo that transformation upon tempering, but which does not form substantial amounts of troostite or softer constituents. The upper limits of chromium and molybdenum are governed in part by the fabricating properties. It will generally be desirable to use less than about 5 per cent each of molybdenum and chromium, for beyond that amount processing difficulties may be encountered, and greater amounts are not necessary for the purpose of the invention.

In the preferred embodiment of the invention, for the production of tool-proof articles, it is preferred to use from about 1 to 3 per cent each of chromium and molybdenum, with nickel between about 3.5 and 7 per cent. Within these ranges the compositions are balanced to maintain the austenite characteristics and tool-proof properties described. Most suitably the combined content of chromium and molybdenum is decreased as the nickel increases. Thus, with 3.5 per cent of nickel a combined chromium and molybdenum content of 4 per cent or over is advantageous. As the nickel is increased to about 7 per cent the chromium-plus-molybdenum should decrease to be not much in excess of 2 per cent.

Our tests thus far have shown that the best results are obtained by maintaining the molybdenum toward the lower limits of its stated range when nickel approaches its lower and upper limits, and increasing the molybdenum when the nickel content is toward the middle of its range. The chromium-plus-molybdenum relations are then maintained, of course, by varying the chromium accordingly. Also, in the higher ranges of chromium-plus-molybdenum the carbon should be increased also toward its upper limit.

The remainder of the steels preferably comprises iron together with the usual elements, such as silicon, manganese, phosphorus and sulfur, and in the amounts normally present in commercial alloy steels. However, these and other elements may be present in amounts which do not adversely affect the tool-proof qualities of the steels. For example, manganese may be present up to about 4 per cent. Inasmuch as such additional elements and impurities contained in the remainder of the alloys do not affect, or modify, the tool-proof properties of the alloys essentially dependent upon the use of chromium, molybdenum and nickel in accordance with the invention, the remainder of the alloys may be considered to be effectively iron, and for purposes of conciseness is so designated in the claims.

Although chromium, nickel and molybdenum are essential elements in the alloys provided by the invention, it will be understood that they can be replaced wholly or in part by elements which exert an equivalent effect. For example, tungsten can be used in place of molybdenum, an equivalent effect being obtained by the use of tungsten in amounts approximately double those of molybdenum.

The tool-proof qualities and other characteristics of our steels may be understood best by actual tests which we have made. In these tests ingots of the steels were cast and hot forged to 1¼ inch square bars. The following analyses are illustrative:

| Steel | C | Ni | Cr | Mo |
|---|---|---|---|---|
| | Per cent | Per cent | Per cent | Per cent |
| A | 1.18 | 3.61 | 2.22 | 2.0 |
| B | 1.48 | 3.59 | 3.08 | 0.97 |
| C | 1.60 | 3.59 | 2.06 | 2.02 |
| D | 1.59 | 5.0 | 2.16 | 1.98 |

The bars made from these steels, all of which were workable, were fully tool-proof both as forged and under the torch test. Their tempering characteristics were shown by tempering, in the manner described, samples 1 inch in length at 600, 800, 1000, 1100 and 1200 and 1400° F. The samples were then subjected to the saw test, a new blade being used to destruction with each sample. In each case they were fully resistant, and prolonged application of the saw resulted only in destruction of its teeth. In no instance could the steels be cut after tempering at the temperatures or range of temperatures given. This is characteristic of the steels contemplated by the invention, and it indicates their marked superiority over the steels used previously for this purpose.

A particularly desirable combination of fabricating and tool-proof qualities is provided by a steel containing 1.59 per cent of carbon, 5.0 per cent of nickel, 2.31 per cent of chromium, and 1.96 per cent of molybdenum, herein designated as Steel E. Samples of this steel remain fully tool-proof after being tempered at all temperatures up to and including 1,800° F. The peculiar structural characteristics of the steels provided by this invention are indicated by tests of the magnetic quality and hardness of steel E, the results being shown in the following table:

| Condition | Magnetism | Hardness Rockwell C. |
| --- | --- | --- |
| Natural | Non-magnetic | 33 |
| Tempered at 800° F | Non-magnetic | 35 |
| Tempered at 1,200° F | Magnetic | 51 |
| Tempered at 1,700° F | Fairly | 43 |
| Tempered at 1,800° F | Weakly | 35 |

These data show that the steel remains austenitic up to 800° F. at least, and that tempering at 1,200° F. causes decomposition of the austenite to martensite. Tempering at increased temperatures, however, does not induce any substantial decomposition to troostite or softer constituent, but causes a partial return to austenite, the structure probably comprising both austenite and martensite. The absence of material amounts of troostite or similar soft constituent after tempering at these elevated temperatures appears, of course, from the fact that the steel remains saw resistant. It is to be observed also that the useful properties are not solely dependent upon the hardness, the steel being tool-proof in the natural and tempered conditions, in which the Rockwell C hardness varied from 33 to 51.

The foregoing characteristics may be seen also by reference to Figs. 1 and 2, which are graphs of the hardness and magnetic data obtained after tempering steels B and D at the temperatures represented. The hardness curve for steel B, Fig. 1, rises rapidly in the lower temperature ranges, and at 1,000° the hardness was about 56. At 1,100° F. the hardness fell off to 51, increasing again at 1,200°. However, none of the samples could be cut with the saw. This is indicated by the letter R at the respective temperatures. The magnetic properties are indicated by the letters below the curve, W meaning weakly magnetic, M magnetic, F fairly magnetic, and N nonmagnetic. After tempering at the lower ranges of temperature the steel is weakly magnetic, while after tempering at the higher ranges it becomes fully magnetic, showing martensite.

Fig. 2 shows the graph plotted from the data obtained from the samples of alloy D. All of the samples were resistant to the saw, and could not be cut. The magnetic qualities of this steel present another aspect of the invention, namely resistance to martensite decomposition upon tempering. The samples tempered at all temperatures up to 1,000° were nonmagnetic. Tempered at 1,100° the steel was weakly magnetic, at 1,200° it was non-magnetic, and only when tempered at temperatures above 1,300° was it fairly magnetic. This shows that the austenite responds sluggishly to heat treatment.

Similar desirable results have been obtained with other steels embodying our invention, among which are the following:

| Steel | C | Ni | Cr | Mo |
| --- | --- | --- | --- | --- |
| | Per cent | Per cent | Per cent | Per cent |
| F | 1.59 | 5.12 | 1.14 | 4.96 |
| G | 1.63 | 5.09 | 3.0 | 0.91 |
| H | 1.63 | 7.16 | 1.16 | 0.89 |

These steels are illustrative of other aspects of the manner in which the essential ingredients may be combined to produce steels which are tool-proof. Thus steel F shows the use of high molybdenum in the middle ranges of nickel; and steel H shows Cr+Mo of about 2 per cent with 7 per cent of nickel. Steel H also shows low molybdenum at the upper limit of nickel, and for the lower range of nickel this is shown by steel B. Tested as before, steels F to H gave satisfactory results.

Alloys within the stated ranges of composition fabricate well, and barrier members consisting of them may be made. If desired, these may take the form of composite structures comprising a matrix, or body, of a soft steel having inserts of the new steels distributed in such manner as to offer resistance to penetration of the member by tools applied in any direction. Such members and the methods of forming them are well known in the art, characteristic structures being shown and described in U. S. Patent No. 1,005,142 to R. C. Becker.

Two of the forms which such composite barrier members may assume are shown in Figs. 3 and 4. Fig. 3 shows a composite plate comprising layers 1 of a soft steel alternately disposed with respect to layers 2 of the steels provided by the invention. A bar member of this nature is shown in Fig. 4, in which inserts 3 are embedded in a body 4 of soft steel. These inserts extend longitudinally throughout the bar, and they are so arranged that tool action is wholly prevented in all directions.

While the steels provided according to the invention have been described chiefly with reference to their advantageous properties when used in the manufacture of jail bars, the same properties render the steels suitable for other purposes. For example, the high hardness which develops upon cold working fits the steels for uses in which abrasion resistance is desirable, as in rail members such as frogs, and the like. They may be used also for other purposes, as for valve and pump parts, cutter bits for mining machines, or to form the teeth of dredger and excavator scoops. For these uses alloys in the lower ranges of carbon will probably be most suitable.

Other applications which make use of the desirable properties of these steels will suggest themselves to those skilled in the art. For instance, many steels having high hardness, and abrasion resistance, are deficient in toughness, so as to be brittle. Our steels, on the other hand possess a satisfactory combination of strength, toughness and resistance to abrasion without the inherent brittleness of the steels just referred to, whose abrasion resistance is obtained through the hardness of the steel. The steels provided by this invention are relatively hard and this, combined with their non-magnetic qualities, adapts them to uses where this property is desirable, and particularly for the production of articles which require also substantial resistance to abrasion.

The martensitic character and structural stability of these steels at elevated temperatures adapts them also for use as hot work articles. As explained previously, we prefer to use more than about 0.9 per cent of carbon for the production of tool proof articles. However, lower carbon steels are usually more desirable for hot work articles, and it is for such cases that we prefer to use carbon about 0.5 per cent, this being the lower range given hereinabove.

According to the provisions of the patent statutes, we have explained our invention and have illustrated and described what we now consider to represent its best embodiment. However, we desire to have it understood that, within the scope of the appended claims, the invention may be practiced otherwise than as specifically shown and described.

We claim:

1. A ferrous base alloy having a tool-proof essentially austenitic structure which is not softened sufficiently by tempering to substantially decrease its tool resistance, the steel containing about 1.25 to 1.75 per cent of carbon, about 1 to 3 per cent of chromium, about 1 to 3 per cent of molybdenum, about 3.5 to 7.0 per cent of nickel, the remainder being iron except for elements present normally and in amounts not adversely affecting the characteristics of the alloy.

2. A ferrous base alloy containing about 1.5 per cent of carbon, about 2.5 per cent of chromium, about 2.0 per cent of molybdenum, about 5.0 per cent of nickel, manganese not over about 0.5 per cent, and the remainder of the alloy being effectively iron, the alloy being tool-proof in both the natural condition and after tempering at temperatures up to about 1400° F.

3. A ferrous base alloy containing about 1.1 to 2.5 per cent of carbon, about 0.7 to 5 per cent of chromium, about 0.7 to 5 per cent of molybdenum, about 3 to 8 per cent of nickel, and the remainder of the alloy being effectively iron, the chromium content of the alloy being more than about 2.5 per cent with nickel toward the lower limit of the range stated and being less than about 2.75 per cent with nickel toward the upper limit stated, and the alloy being characterized by having an austenitic structure which is convertible by tool work and by tempering to a martensitic, or austenitic-martensitic, structure which is resistant to tools and abrasion, but which is not converted by tempering to softer constituents in an amount sufficient to adversely affect said resistance.

4. A ferrous base alloy containing about 1.1 to 2.5 per cent of carbon, about 0.7 to 5 per cent of chromium, about 0.7 to 5 per cent of molybdenum, about 3 to 8 per cent of nickel, and the remainder of the alloy being effectively iron, the combined content of chromium and molybdenum being between about 2 to 8 per cent, and the chromium being more than about 2.5 per cent with nickel toward the lower limit of the range stated and being less than about 2.75 per cent with nickel toward the upper limit of the range stated, and the alloy being characterized by having an austenitic structure which is convertible by tool work and by tempering to a martensitic, or austenitic-martensitic, structure which is resistant to tools and abrasion, but which is not converted by tempering to softer constituents in an amount sufficient to adversely affect said resistance.

5. A ferrous base alloy containing about 1.1 to 2 per cent of carbon, about 2.5 to 5 per cent of chromium, about 1 to 5 per cent of molybdenum, about 3.5 to 5 per cent of nickel, and the remainder of the alloy being effectively iron, and the alloy being characterized by having an austenitic structure which is convertible to a martensitic, or austenitic-martensitic, tool-proof and abrasion-resistant structure by tool work and by tempering, but which is not converted by tempering to softer constituents in an amount sufficient to adversely affect the tool-proof and abrasion-resistant qualities.

6. A ferrous base alloy containing about 1.1 to 2 per cent of carbon, about 1.5 to 4 per cent of chromium, about 1 to 5 per cent of molybdenum, about 4 to 6 per cent of nickel, and the remainder of the alloy being effectively iron, the combined content of chromium and molybdenum in the alloy being in excess of about 3 per cent, and the alloy being characterized by having an austenitic structure which is convertible to a martensitic, or austenitic-martensitic, tool-proof and abrasion-resistant structure by tool work and by tempering, but which is not converted by tempering to softer constituents in an amount sufficient to adversely affect the tool-proof and abrasion-resistant qualities.

7. A ferrous base alloy containing about 1.25 to 2 per cent of carbon, about 0.75 to 2.75 per cent of chromium, about 0.75 to 3.5 per cent of molybdenum, about 5.5 to 7.5 per cent of nickel, and the remainder of the alloy being effectively iron, and the alloy being characterized by having an austenitic structure which is convertible to a martensitic, or austenitic-martensitic, tool-proof and abrasion-resistant structure by tool work and by tempering, but which is not converted by tempering to softer constituents in an amount sufficient to adversely affect the tool-proof and abrasion-resistant qualities.

8. A tool-proof barrier member formed from a ferrous base alloy containing about 1.1 to 2.5 per cent of carbon, about 0.7 to 5 per cent of chromium, about 0.7 to 5 per cent of molybdenum, about 3 to 8 per cent of nickel, and the balance of the alloy being effectively iron, and said member being characterized by being tool-proof before and after tempering.

9. A tool-proof barrier member formed from a ferrous base alloy containing about 1.1 to 2.5 per cent of carbon, about 0.7 to 5 per cent of chromium, about 0.7 to 5 per cent of molybdenum, about 3 to 8 per cent of nickel, and the remainder of the alloy being effectively iron, the combined content of chromium and molybdenum in the alloy being between about 2 to 8 per cent, and the chromium being more than about 2.5 per cent with nickel toward the lower limit of the range stated and being less than about 2.75 per cent with nickel toward the upper limit of the range stated, and said member being characterized by being tool-proof before and after tempering.

10. A tool-proof barrier member formed from a ferrous base alloy containing about 1.1 to 2 per cent of carbon, about 2.5 to 5 per cent of chromium, about 1 to 5 per cent of molybdenum, about 3.5 to 5 per cent of nickel, and the remainder of the alloy being effectively iron, and said member being characterized by being tool-proof before and after tempering.

11. A tool-proof barrier member formed from a ferrous base alloy containing about 1.1 to 2 per cent of carbon, about 1.5 to 4 per cent of chromium, about 1 to 5 per cent of molybdenum, about 4 to 6 per cent of nickel, and the remainder of the alloy being effectively iron, the combined content of chromium and molybdenum in the alloy being in excess of about 3 per cent, and said member being tool-proof before and after tempering.

12. A tool-proof barrier member formed from a ferrous base alloy containing about 1.25 to 2 per cent of carbon, about 0.75 to 2.75 per cent of chromium, about 0.75 to 3.5 per cent of molybdenum, about 5.5 to 7.5 per cent of nickel, and the remainder of the alloy being effectively iron, and said member being tool-proof before and after tempering.

13. A tool-proof barrier member formed from a ferrous base alloy containing about 1.5 per cent of carbon, about 2.5 per cent of chromium, about 2 per cent of molybdenum, about 5 per cent of nickel, and the balance of the alloy being effectively iron, and said member being tool-proof in the natural condition and after tempering at temperatures up to about 1800° F.

ROBERT C. BECKER.
FRANKLIN H. ALLISON, Jr.